(12) United States Patent
Plagemann et al.

(10) Patent No.: US 12,539,678 B2
(45) Date of Patent: Feb. 3, 2026

(54) COATING SYSTEM AND METHOD

(71) Applicant: Tecton Products, LLC, Fargo, ND (US)

(72) Inventors: Robert P. Plagemann, Fargo, ND (US); Neena Ravindran, Fargo, ND (US)

(73) Assignee: Tecton Products, LLC, Fargo, ND (US)

( * ) Notice: Subject to any disclaimer, the term of this patent is extended or adjusted under 35 U.S.C. 154(b) by 0 days.

(21) Appl. No.: 18/120,616

(22) Filed: Mar. 13, 2023

(65) Prior Publication Data
US 2023/0211573 A1    Jul. 6, 2023

Related U.S. Application Data

(63) Continuation of application No. 17/354,151, filed on Jun. 22, 2021, now Pat. No. 11,602,907, which is a
(Continued)

(51) Int. Cl.
*B29C 70/52* (2006.01)
*B29C 37/00* (2006.01)
(Continued)

(52) U.S. Cl.
CPC ........ *B29C 70/526* (2013.01); *B29C 37/0025* (2013.01); *B29C 48/06* (2019.02);
(Continued)

(58) Field of Classification Search
CPC .................................................. B29C 70/521
See application file for complete search history.

(56) References Cited

U.S. PATENT DOCUMENTS

| 4,126,601 A * | 11/1978 | Cartier | ............. C08J 7/043 525/61 |
|---|---|---|---|
| 4,427,823 A | 1/1984 | Inagaki et al. | |

(Continued)

FOREIGN PATENT DOCUMENTS

| WO | 0206037 | 1/2002 |
|---|---|---|
| WO | 2013025739 | 2/2013 |

(Continued)

OTHER PUBLICATIONS

"U.S. Appl. No. 14/969,396, Restriction Requirement mailed Jan. 23, 2018", 8 pgs.
(Continued)

*Primary Examiner* — Cachet I Proctor
(74) *Attorney, Agent, or Firm* — Schwegman, Lundberg & Woessner, P.A.

(57) ABSTRACT

A method of manufacturing a coated article comprises injecting a feedstock with a polymer resin to provide a resin-injected feedstock, pulling the resin-injected feedstock through a pultrusion die to form a pultrusion substrate having one or more profile surfaces, adhering an adhesive material comprising a thermoplastic polyurethane onto at least a portion the one or more profile surfaces to form one or more adhesive tie layers on the pultrusion substrate, and applying one or more coating materials onto the one or more adhesive tie layers to form one or more coating layers on the one or more adhesive tie layers to provide a coated pultrusion article, wherein an adhesion strength between the one or more coating layers and the one or more adhesive tie layers is higher than a corresponding adhesion strength would be between the one or more coating layers and the pultrusion substrate.

20 Claims, 7 Drawing Sheets

Related U.S. Application Data continuation of application No. 16/233,457, filed on Dec. 27, 2018, now Pat. No. 11,072,132, which is a continuation-in-part of application No. 14/969,396, filed on Dec. 15, 2015, now abandoned.

(60) Provisional application No. 62/654,830, filed on Apr. 9, 2018, provisional application No. 62/091,786, filed on Dec. 15, 2014.

(51) Int. Cl.
   *B29C 48/06*   (2019.01)
   *B29C 48/156*  (2019.01)
   *B29C 65/52*   (2006.01)
   *B29K 75/00*   (2006.01)
   *B29L 9/00*    (2006.01)

(52) U.S. Cl.
   CPC .......... *B29C 48/156* (2019.02); *B29C 65/525* (2013.01); *B29C 70/521* (2013.01); *B29K 2075/00* (2013.01); *B29L 2009/005* (2013.01)

(56) References Cited

U.S. PATENT DOCUMENTS

| | | | |
|---|---|---|---|
| 4,938,823 A * | 7/1990 | Balazek | B29C 48/12 |
| | | | 156/166 |
| 5,492,583 A | 2/1996 | Fingerson et al. | |
| 5,547,720 A * | 8/1996 | Rittler | B32B 17/10311 |
| | | | 428/913 |
| 5,556,496 A | 9/1996 | Sumerak | |
| 6,000,814 A | 12/1999 | Nestell et al. | |
| 6,197,412 B1 | 3/2001 | Jambois et al. | |
| 6,331,223 B1 | 12/2001 | Wylie et al. | |
| 6,444,311 B1 | 9/2002 | Friedman et al. | |
| 7,901,762 B2 | 3/2011 | Brown et al. | |
| 8,209,922 B2 | 7/2012 | Petersen | |
| 8,955,281 B2 | 2/2015 | Pietruczynik et al. | |
| 9,682,674 B2 | 6/2017 | Corwin et al. | |
| 11,072,132 B2 | 7/2021 | Plagemann et al. | |
| 11,602,907 B2 | 3/2023 | Plagemann et al. | |
| 2002/0014302 A1 | 2/2002 | Fanucci et al. | |
| 2003/0109638 A1 | 6/2003 | Briggs et al. | |
| 2007/0113958 A1 | 5/2007 | Brown et al. | |
| 2008/0160298 A1 * | 7/2008 | Li | B32B 37/182 |
| | | | 428/447 |
| 2010/0035017 A1 | 2/2010 | Green | |
| 2010/0048831 A1 | 2/2010 | Janowicz et al. | |
| 2010/0203346 A1 * | 8/2010 | Grimes | C08J 5/18 |
| | | | 525/183 |
| 2013/0052395 A1 * | 2/2013 | Davis | B32B 27/304 |
| | | | 428/424.6 |
| 2015/0247025 A1 | 9/2015 | Ichikawa et al. | |
| 2015/0299947 A1 | 10/2015 | Brumbelow et al. | |
| 2015/0376946 A1 | 12/2015 | Kurzer et al. | |
| 2016/0167259 A1 | 6/2016 | Plagemann et al. | |
| 2019/0126571 A1 | 5/2019 | Plagemann et al. | |
| 2019/0308396 A1 | 10/2019 | Plagemann et al. | |
| 2020/0123368 A1 | 4/2020 | Yamaguchi et al. | |
| 2021/0308966 A1 | 10/2021 | Plagemann et al. | |
| 2021/0323211 A1 | 10/2021 | Plagemann et al. | |
| 2022/0347907 A1 * | 11/2022 | Larsen | B29C 48/0022 |

FOREIGN PATENT DOCUMENTS

| | | | |
|---|---|---|---|
| WO | 2015160585 | 10/2015 | |
| WO | WO-2015160585 A1 * | 10/2015 | ......... B29C 35/0805 |

OTHER PUBLICATIONS

"U.S. Appl. No. 14/969,396, Response filed Mar. 2, 2018 to Restriction Requirement mailed Jan. 23, 2018", 8.
"U.S. Appl. No. 14/969,396, Non Final Office Action mailed Jun. 27, 2018", 9 pgs.
"U.S. Appl. No. 16/233,457, Non Final Office Action mailed Oct. 6, 2020", 10 pgs.
"U.S. Appl. No. 16/379,164, Restriction Requirement mailed Oct. 15, 2020", 7 pgs.
"U.S. Appl. No. 16/379,164, Response filed Nov. 2, 2020 to Restriction Requirement mailed Oct. 15, 2020", 8 pgs.
"U.S. Appl. No. 16/379,164, Non Final Office Action mailed Nov. 24, 2020", 8 pgs.
"U.S. Appl. No. 16/233,457, Examiner Interview Summary mailed Dec. 8, 2020", 3 pgs.
"U.S. Appl. No. 16/233,457, Response filed Dec. 14, 2020 to Non Final Office Action mailed Oct. 6, 2020", 14 pgs.
"U.S. Appl. No. 16/379,164, Response filed Jan. 8, 2021 to Non Final Office Action mailed Nov. 24, 2020", 20 pgs.
"Canadian Application Serial No. 2,915,382, Office Action mailed Jan. 5, 2021", 1 pg.
"U.S. Appl. No. 16/379,164, Final Office Action mailed Mar. 17, 2021", 12 pgs.
"U.S. Appl. No. 16/233,457, Notice of Allowance mailed Mar. 26, 2021", 13 pgs.
"U.S. Appl. No. 16/233,457, Corrected Notice of Allowability mailed Apr. 1, 2021", 4 pgs.
"U.S. Appl. No. 17/318,662, Restriction Requirement mailed Jun. 14, 2022", 8 pgs.
"U.S. Appl. No. 17/318,662, Response filed Aug. 8, 2022 to Restriction Requirement mailed Jun. 14, 2022", 7 pgs.
"U.S. Appl. No. 17/318,662, Non Final Office Action mailed Aug. 30, 2022", 10 pgs.
"U.S. Appl. No. 17/354,151, Notice of Allowance mailed Nov. 16, 2022", 9 pgs.
"U.S. Appl. No. 17/318,662, Response filed Nov. 30, 2022 to Non Final Office Action mailed Aug. 30, 2022", 16 pgs.
"U.S. Appl. No. 17/318,662, Final Office Action mailed Feb. 1, 2023", 9 pgs.
U.S. Appl. No. 14/969,396, filed Dec. 15, 2015, Coating System and Method.
U.S. Appl. No. 16/379,164, filed Apr. 9, 2019, Coating System and Method.
U.S. Appl. No. 16/233,457 U.S. Pat. No. 11,072,132, filed Dec. 27, 2018, Coating System and Method.
U.S. Appl. No. 17/354,151 U.S. Pat. No. 11,602,907, filed Jun. 22, 2021, Coating System and Method.
U.S. Appl. No. 17/318,662, filed May 12, 2021, Coating System and Method.
"Canadian Application Serial No. 3,065,837, Examiners Rule 86(2) Report mailed May 7, 2025", 3 pgs.

* cited by examiner

COATING SYSTEM AND METHOD

CROSS-REFERENCE TO RELATED APPLICATION

This application is a continuation of U.S. patent application Ser. No. 17/354,151, filed Jun. 22, 2021, which application is a continuation of U.S. patent application Ser. No. 16/233,457, filed Dec. 27, 2018, issued on Jul. 27, 2021 as U.S. Pat. No. 11,072,132, which application is a continuation-in-part of pending U.S. patent application Ser. No. 14/969,396, filed on Dec. 15, 2015, entitled "COATING SYSTEM AND METHOD," which claims the benefit of priority to U.S. Provisional Patent Application Ser. No. 62/091,786, filed on Dec. 15, 2014, entitled "COATING SYSTEM AND METHOD," the disclosures of which are incorporated by reference herein in their entireties.

U.S. patent application Ser. No. 16/233,457 also claims the benefit of priority to U.S. Provisional Application Ser. No. 62/654,830, filed on Apr. 9, 2018, entitled "COATING SYSTEM AND METHOD," the disclosure of which is incorporated herein by reference in its entirety.

BACKGROUND

Pultrusion is a continuous process for manufacturing a composite material that entails simultaneously pulling a reinforcement material through a resin impregnating processing equipment and peripheral manufacturing equipment and cross-head extruding the composite material onto a component. Pultrusion systems used in industry can include a resin mixer and a resin impregnator for impregnating or injecting the resin into the reinforcement material, such as one or more reinforcement fibers. The resin impregnated reinforcement material can be pulled through a heated die (e.g., a pultrusion die) to form a substrate. The resulting substrate formed by the pultrusion process can include a three-dimensional shape formed through one or more pultrusion dies.

In various examples, a pultrusion process can include coating the substrate, for example with a coating that can improve weatherability, durability, and aesthetics of the finished article.

SUMMARY

The present disclosure describes systems and methods for producing one or more pultrusion articles having a coating. The present disclosure also describes coated pultrusion articles, e.g., made from one or more of the systems or methods described herein. In some examples, the systems and methods described herein provide for coating a substrate, such as a pultrusion substrate, having a coating that is particularly resistant to weathering under typical weather conditions that the coated pultrusion article can be exposed to when placed in an external environment.

BRIEF DESCRIPTION OF THE DRAWINGS

The drawings illustrate generally, by way of example, but not by way of limitation, various embodiments discussed in the present document.

DETAILED DESCRIPTION

Figure 1:
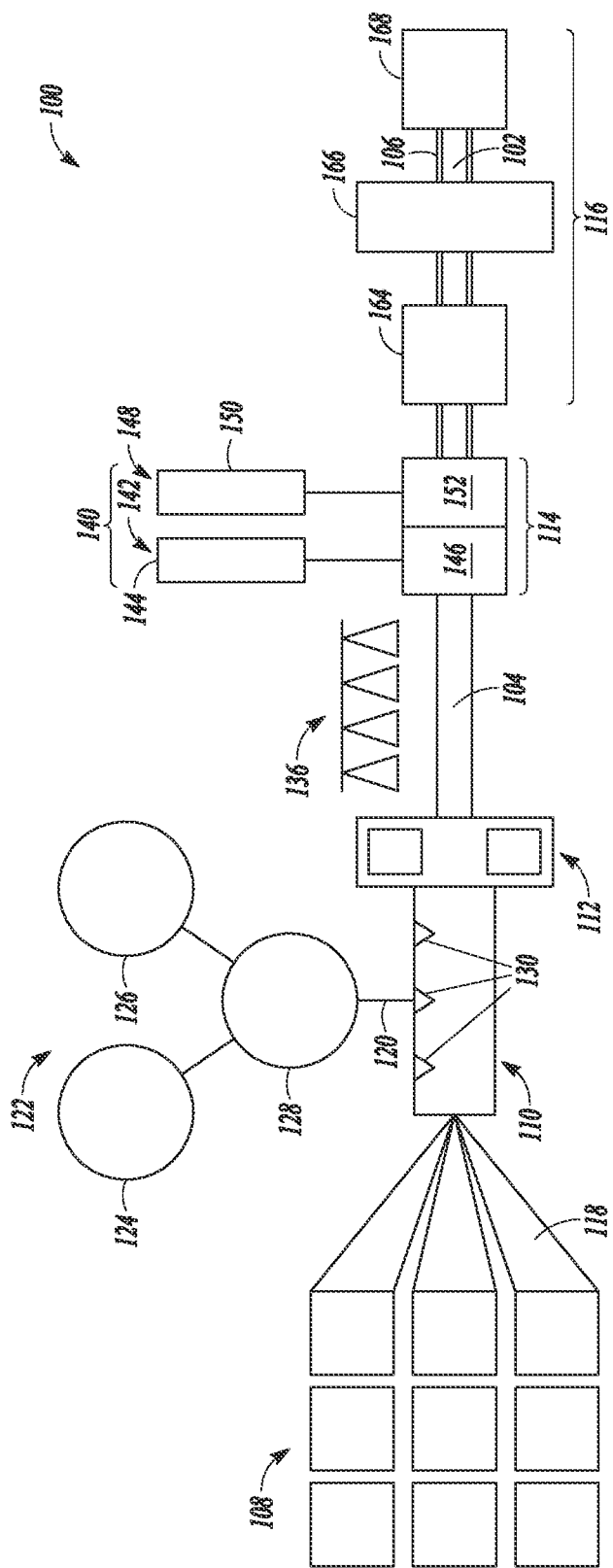
FIG. 1 is a schematic diagram of an example system for manufacturing an example elongate pultrusion article with a coating.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y,"" unless indicated otherwise. Likewise, the statement "about X, Y, or about Z" has the same meaning as "about X, about Y, or about Z," unless indicated otherwise.

The terms "a," "an," or "the" are used to include one or more than one unless the context clearly dictates otherwise.

The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G." A comma can be used as a delimiter or digit group separator to the left or right of a decimal mark; for example, "0.000,1"" is equivalent to "0.0001."

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range, and includes the exact stated value or range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

The term "layer," as used in describing a layer of the substrate coatings, although used in the singular, can refer to a single layer of the particular material being described or can refer to a plurality of layers of the same material or substantially the same material. In this way, when the term "layer" is used, it will be understood to mean "one or more layers" unless the description expressly states that a specific structure comprises a "single layer" of the material.

In methods described herein, the steps can be carried out in any order without departing from the principles of the invention, except when a temporal or operational sequence is explicitly recited. Furthermore, specified acts can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, then several other steps are subsequently performed, shall be taken to mean that the first step is commenced before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, including concurrently with one on both of steps A and E, and that such a sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Pultrusion Forming and Coating System

FIG. 1 shows a schematic diagram of an example system 100 for manufacturing a coated pultrusion article 102. In an example, the system 100 manufactures a pultruded substrate 104 and applies a coating 106 to the substrate 104 to provide the coated pultrusion article 102, e.g., wherein the coating 106 can be selected to provide one or more improved properties, such as at least one of improved aesthetics, improved color, or improved weatherability compared to the uncoated substrate 104. Therefore, for the sake of clarity and brevity, the system 100 may be referred to herein as a pultrusion and coating system 100, and the substrate 104 may be referred to herein as a pultrusion substrate 104.

In an example, the pultrusion and coating system 100 comprises a feed system 108, a resin-injection assembly 110, a pultrusion die 112, a coating system 114, and a finishing system 116. The feed system 108 provides a feedstock 118 to the pultrusion and coating system 100, and in particular to the resin-injection assembly 110. The feedstock 118 can comprise one or more reinforcement structures to which a resin can be applied in order to provide a composite material in the form of the pultrusion substrate 104. In an example, the one or more reinforcement structures of the feedstock 118 can comprise one or more continuous fibers, such as one or more reinforcing fibers. Examples of the one or more reinforcing fibers that can be used as the reinforcement feedstock 118 in the pultrusion and coating system 100 include, but are not limited to, glass fibers, basalt fibers, carbon aramid fibers, Kevlar fibers, natural fibers, such as flax or hemp, among others.

The feed system 108 can include one or more systems to store and feed the feedstock 118 in such a manner that the feedstock 118 is continuously fed to the rest of the pultrusion and coating system 100. In an example, the feed system 108 includes a carting system and an aligning system that delivers or provides the feedstock 118 to another portion of the pultrusion and coating system 100. In an example wherein the feedstock 118 comprises one or more continuous reinforcing fibers, each of the one or more fibers can be stored as a roving that is continuously fed to the other portion of the pultrusion and coating system 100.

In an example, the feed system 108 can deliver or provide the feedstock 118 to the resin-injection assembly 110. The resin-injection assembly 110 can include a resin feed device or devices to feed a polymer resin 120 to the feedstock 118. In an example, the resin-injection assembly 110 can inject the polymer resin 120 into contact with the feedstock 118. The resin-injection assembly 110 can sufficiently inject the polymer resin 120 so that the feedstock 118 is at least partially impregnated with and at least partially surrounded by the polymer resin 120.

In an example, the polymer resin 120 comprises a thermoset resin, such as a polyester resin or a polyester-based resin, a polyurethane resin or a polyurethane-based resin, or a vinyl ester or vinyl ester-based resin. In other examples, the polymer resin 120 comprises a low-viscosity thermoplastic resin, such as an acrylic-based thermoplastic such as a methyl methacrylate (MMA) based or methyl acrylate based thermoplastic. In some examples, the polymer resin 120 can be formed by mixing one or more precursor compounds that, when combined, can form the desired final composition of the polymer resin 120. The polymer resin 120 can be pre-mixed or the resin-injection assembly 110 can include a resin-mixing system 122 that mixes one or more resin constituents to form a resin mixture having a specified composition. The resin-mixing system 122 can include a plurality of storage vessels each supplying a resin constituent. In an example, the resin-mixing system 122 includes a first resin storage vessel 124 for a first resin constituent and a second resin storage vessel 126 for a second resin constituent. The resin-mixing system 122 can optionally further include one or more additional storage vessels for one or more additional resin constituents, such as a third storage vessel for a third resin constituent, a fourth storage vessel for a fourth resin constituent, and so on. The plurality of storage vessels can be communicatively coupled to a mixing apparatus 128, such as a mixing vessel or a mixing device, wherein each corresponding resin constituent from the plurality of storage vessels 124, 126 can be mixed to provide the polymer resin 120 having the specified composition.

For example, in the case of a polyurethane or polyurethane-based resin, a first polyurethane constituent can comprise one or more polyols such that the first resin storage vessel 124 can be one or more polyol storage vessels. A second polyurethane constituent can comprise one or more isocyanates such that the second resin storage vessel 126 can be one or more isocyanate storage vessels. The one or more polyol storage vessels 122 and the one or more isocyanate storage vessels 124 can be communicatively coupled to the mixing apparatus 128 where the one or more polyols from the one or more polyol storage vessels 122 and the one or more isocyanates from the one or more isocyanate storage vessels 124 can be mixed to form a polyurethane-based polymer resin 120. Similar combinations of storage vessels 122, 124 and the mixing apparatus 128 can be set up for the formation of a polyester or polyester-based resin 120 or for the formation of other compositions of polymer resin 120, such as low-viscosity thermoplastic resin systems.

In an example, the polymer resin 120 that is applied to the feedstock 118 can include one or more fillers to modify physical properties of the polymer formed from the resin and of the pultrusion substrate 104. Examples of fillers that can be used in the polymer resin 120 include, but are not limited to, particles of calcium carbonate ($CaCO_3$), alumina trihydrate ($Al_2O_3 \cdot 3 H_2O$), talc (e.g., a mineral form of hydrated magnesium silicate, $H_2Mg_3(SiO_3)_4$), clay, or one or more types of glass filler particles (such as glass spheres). In an example, the resin-injection assembly 110 includes a feedstock alignment system to align the feedstock 118 in a desired configuration for resin impregnation.

The resin-mixing system 122 can include a pumping system that is communicatively coupled to the mixing apparatus 128. The pumping system can withdraw the polymer resin 120 from the mixing apparatus 128 and feed the resin mixture to one or more resin nozzles 130. Each of the one or more resin nozzles 130 can inject or otherwise apply the polymer resin 120 to the feedstock 118.

In an example, the feed system 108 can include one or more heating devices to heat at least one of: (a) one or more of the resin constituents, e.g., before mixing the one or more resin constituents; (b) the resin mixture within the mixing apparatus, e.g., after mixing of the one or more resin constituents; or (c) the resin mixture in a feed line between the mixing apparatus and the one or more resin nozzles, e.g., after withdrawing the resin mixture with the pumping system. Each of the one or more heating devices can heat the component being heated (e.g., one or more of the resin constituents or the resin mixture) to a specified temperature, e.g., to be more conducive to polymerization and formation of the polymer of the pultrusion substrate 104.

The feedstock 118 can be pulled or otherwise forced through the pultrusion die 112 to shape the feedstock 118 into a desired shape in the form of the pultrusion substrate 104. The pultrusion die 112 can produce a cross-sectional profile of the resin-injected feedstock 118. Examples of profiles that can be formed by the resin-injection assembly 110 and the pultrusion die 112 include, but are not limited to, pultrusion articles in the form of an architectural fenestration component, a building component, a solar component, a furniture component, a refrigeration component, or a component of a piece of agricultural equipment. Pultrusion of the resin-injected feedstock 118 through the pultrusion die 112 results in a pultrusion substrate 104 having one or more profile surfaces in a specified configuration to form the specified cross-sectional profile.

Figure 3A:
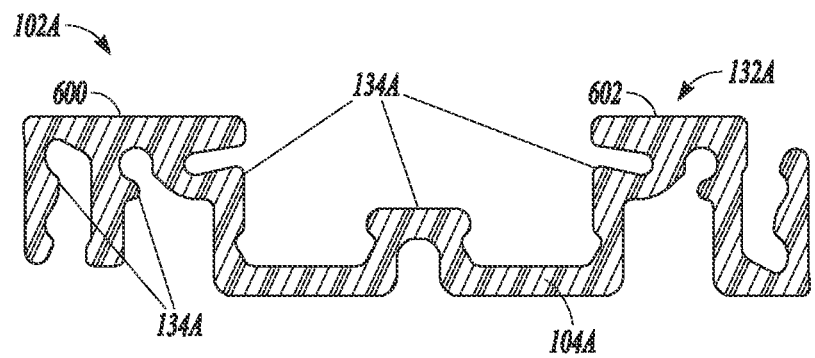
FIGS. 3A and 3B are cross-sectional views of example pultrusion articles, for example that can be manufactured by the examples systems of FIG. 1 or 2.
Figure 3B:
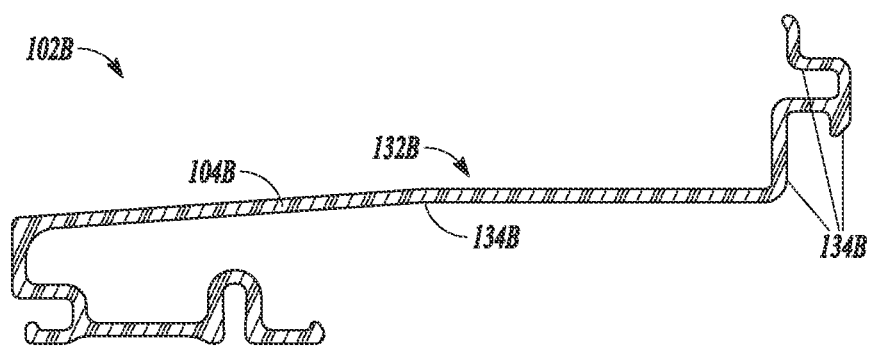

FIGS. 3A and 3B show two examples of coated articles 102A and 102B formed by coating pultrusion substrates 104A and 104B, wherein the pultrusion substrates 104A, 104B provide two examples of cross-sectional profiles 132A, 132B, respectively, that can be formed, for example using the pultrusion die 112. FIG. 3A shows a profile view of an example profile 132A for a modular patio door sill, while FIG. 3B shows a profile view of an example profile 132B for a window frame cladding. The specific profiles 132A, 132B of the pultrusion substrates 104A and 104B shown in FIGS. 3A and 3B are included as examples for illustration purposes only. As will be understood by a person of ordinary skill in the art, the systems, methods, and resulting articles described herein are not limited to the specific pultrusion profiles 132A and 132B or forms shown in FIGS. 3A and 3B. The profile 132 formed by pultruding the feedstock 118 through the pultrusion die 112 can include one or more profile surfaces 134A, 134B, e.g., outer surfaces of the pultrusion substrates 104A, 104B (best seen in FIGS. 3A and 3B).

Returning to FIG. 1, the pultrusion and coating system 100 can include one or more heating devices associated with the pultrusion die 112, such as one or more heaters, for example one or more integral die heaters or one or more heaters external to the pultrusion die 112, or both. The one or more heaters associated with the pultrusion die 112 can provide for thickening or gelling, or both, of the polymer resin 120, for example by initiating or continuing polymerization of the one or more resin constituents in the polymer resin. The one or more heating devices can also provide for full or partial curing of the polymer resin within or substantially immediately downstream of the pultrusion die 112.

In an example, the pultrusion and coating system 100 includes one or more pretreatment operations to treat the pultrusion substrate 104 after it exits the pultrusion die 112 but before the pultrusion substrate 104 is fed into the coating system 114. Pretreatment can prepare the pultrusion substrate 104 for coating by the coating system 114. In an example, the pretreatment can prepare the surfaces onto which the coating 106 will be applied (for example the profile surfaces 134A, 134B on the pultrusion substrates 104A and 104B in FIGS. 3A and 3B) for bonding with the material of the coating 106. Examples of pretreatment operations include, but are not limited to, one or any combination of: heating the pultrusion substrate 104, such as by heating at least the surfaces to be coated (e.g., surfaces 134A and 134B in FIGS. 3A and 3B); cleaning one or more of the surfaces to be coated, such as with one or more solvents; abrasion treatment of one or more of the surfaces to be coated; or applying one or more chemical treatments, such as a plasma.

In the example shown in FIG. 1, the pretreatment of the pultrusion substrate 104 comprises heating the pultrusion substrate 104 with one or more in-line heaters 136 downstream of the pultrusion die 112. The one or more heaters 136 can be configured, or can be part of a temperature control system, to control or maintain a temperature of the pultrusion substrate 104 downstream of the pultrusion die 112 and before the pultrusion substrate 104 enters the coating system 114. In an example, the one or more heaters 136 can be configured to control or maintain a temperature of the pultrusion substrate 104 so that the portions of the one or more surfaces onto which the one or more layer of coating material is to be applied (such as the profile surfaces 134A and 134B in FIGS. 3A and 3B) to form the coating 106, will be at a specified temperature. The specified temperature can be a temperature that will perform one or more of the following: improved or optimized polymerization of the one or more constituents of the polymer resin 120 to form the final matrix polymer of the pultrusion substrate 104; improved adhesion of the coating 106 to the one or more surfaces being coated; or improved formation of the one or more coating material layers, e.g., via setting, gelling, or other polymerization of the one or more coating materials after application to the pultrusion substrate 104. In an example, the one or more heaters 136 include one or more infrared heaters that emit infrared radiation onto the pultrusion substrate 104. The pultrusion and coating system 100 can also include temperature sensors to measure a temperature of the pultrusion substrate 104 and to control an output of the one or more heaters 136 based on a measured temperature of the pultrusion substrate 104, e.g., in the manner of a feedback control loop.

In an alternative example, the pultrusion and coating system can omit in-line heaters (such as the one or more heaters 136 in FIG. 1A) are omitted, and the coating system can be located in close physical proximity to the exit of the pultrusion die. In particular, the exit of the pultrusion die can be in close physical proximity to the entrance to the first material extruder that is to coat a material onto the pultrusion substrate 104, i.e., the first coating material extruder 142. In such a system, the temperature of the pultrusion substrate exiting the pultrusion die can be controlled at the pultrusion die, e.g., with a heater within or immediately upstream of the pultrusion die that is controlled to not only provide a temperature that is conducive to setting or gelling of the matrix polymer, but also to provide a temperature of the pultrusion substrate exiting the pultrusion die that is conducive for coating with one or more coating materials.

Returning to FIG. 1, as noted above, the pultrusion and coating system 100 includes a coating system 114 to apply a coating 106 onto the pultrusion substrate 104, e.g., onto at least a portion of one or more surfaces of the pultrusion substrate 104 (such as the profile surfaces 134A, 134B in FIGS. 3A and 3B), to provide the coated pultrusion article 102. As described in more detail below, the coating 106 can include one or more coating layers that are coated onto the pultrusion substrate 104. The coating system 114 includes a coating-material application assembly 140 to apply one or more coating materials onto the pultrusion substrate 104 to form the one or more layers of the coating 106.

The coating-material application assembly 140 can include a coating material extruder 142 comprising a coating material storage vessel 144 and a coating material die 146. In an example, the coating-material application assembly 140 applies a single coating layer onto the pultrusion substrate 104. In such an example, the coating-material application assembly 140 may comprise only a single coating material extruder 142 of a single coating material storage vessel 144 feeding a single coating material die 146. In another example, the coating-material application assembly 140 applies a plurality of coating layers onto the one or more tie layers to form the coated pultrusion article 102. Each layer of the plurality of coating layers can be formed from a different coating material composition, or each layer can comprise the same coating composition. In the example shown in FIG. 1, the pultrusion and coating system 100 is configured to form a coating 106 comprising two coating layers. In such an example, the coating-material application assembly 140 can include a first coating material extruder 142 configured to form a first coating layer on the pultrusion substrate 104 and a second coating material extruder 148 configured to form a second coating layer on the first coating layer. The first coating material extruder 142 can include a first coating material storage vessel 144 and a first coating die 146 configured to form a first coating layer, e.g., on top of one or more surfaces of the pultrusion substrate 104. The second coating material extruder 148 comprises a second coating material storage vessel 150 and a second coating die 152 to form a second coating layer, e.g., on top of the first coating layer. Different example configurations of one coating layer or two coating layers are described below. In various examples, the coating-material application assembly 140 includes a coating die 146, 152 for each coating layer or includes a co-extrusion die to apply two or more coating layers at substantially the same time to the pultrusion substrate 104.

Examples of materials that can form each of the one or more coating layers include, but are not limited to, at least one of: one or more acrylics, one or more bioplastics, polyvinylchloride, polyvinylidene fluoride, acrylonitrile-styrene-acrylate, weather stock (e.g., weather capping or a weather resistant coating), aesthetic coatings, texturization coatings, one or more clear-coat materials, one or more primer compositions, or blends thereof. As described in more detail below, in an example, the coating 106 includes at least two layers that form a protective bi-layer to provide one or more of mechanical protection (e.g., scratch resistance); weatherability; or chemical resistance. In some examples, the protective bi-layer includes a first protective layer that is closest to the pultrusion substrate 104 (e.g., that is applied directly to one or more of the outer surfaces of the pultrusion substrate 104, such as the profile surfaces 134A, 134B in FIGS. 3A and 3B) or that is applied directly to one or more intermediate layers, such as one or more adhesive tie layers, that are disposed between the coated surface of the pultrusion substrate 104 and the protective bi-layer), also referred to as the inner protective layer, and a second layer that is applied to an outer surface or interface of the first or inner protective layer, also referred to as an outer protective layer. The inner protective layer comprises an acrylic-based thermoplastic polymer, such as poly(methyl methacrylate), and the outer protective layer comprises a blend of an acrylic-based thermoplastic polymer (which can be the same as or different from the polymer that forms the inner protective layer) and a fluoride-containing polymer, such as poly(vinylidene difluoride).

Once the coating system 114 applies the coating 106, it provides the coated pultrusion article 102, which is further processed by the finishing system 116. In an example, the finishing system 116 includes one or more of a cooling assembly 164 or a pulling mechanism 166. The cooling assembly 164 cools the coated pultrusion article 102, for example by exposing the coated pultrusion article 102 to a cooling medium, such as forced air (e.g., a fan or nozzle providing air at a temperature less than the coated profile), ambient air (e.g., non-forced air), or a cooling liquid, such as in an immersion bath or a cooling liquid sprayed onto the coated profile.

The pulling mechanism 166 pulls the coated pultrusion article 102 from the pultrusion and coating system 100, which in turn will pull the pultrusion substrate 104 from the pultrusion die 112 through the coating system 114, which in turn will pull the feedstock 118 from the feed system 108 through the resin-injection assembly 110 and into the pultrusion die 112. The rate that the pulling mechanism 166 can move the coated pultrusion article 102, pultrusion substrate 104, and feedstock 118 through the pultrusion and coating system 100 can be variable according to a specified production rate, a specific three-dimensional profile 132 of the coated pultrusion article 102 being produced, the materials being used for the pultrusion substrate 104 (e.g., the feedstock 118 and the polymer resin 120), the one or more coating layers, factory conditions, or the like. In various examples, the finishing system 116 can include additional processing apparatuses, such as, but not limited to a cutting mechanism 168 to section the coated pultrusion article 102 to a specified size (e.g. to a predetermined length), a stacking assembly (not shown) to package the cut coated pultrusion articles 102 for shipment, and the like.

In some examples, the pultrusion substrate has one or more surfaces that are relatively smooth or that have a relatively low surface energy, such as a pultruded polyurethane or polyurethane-based substrate. In some examples, a pultrusion and coating system can provide for adequate bonding of a coating material to surfaces that are relatively smooth or have a relatively low-surface energy, or both. In examples, the terms "highly smooth," "relatively smooth," and/or "low surface energy" or "relatively low surface energy," as used herein, can refer to a surface having a water contact angle of less than 65°, such as less than about 60°, for example less than 55°. For example, a particular polyurethane-based pultrusion substrate composition has a water contact angle in the range of about 45° to about 55°, when measured by the contact angle measurement instrument having the model number FTA125, sold by First Ten Angstroms, Inc., Portsmouth, VA, USA. It was found to be difficult to bond coating materials directly to this particular polyurethane-based substrate with the water contact angle of about 45° to about 55°.

Figure 2:
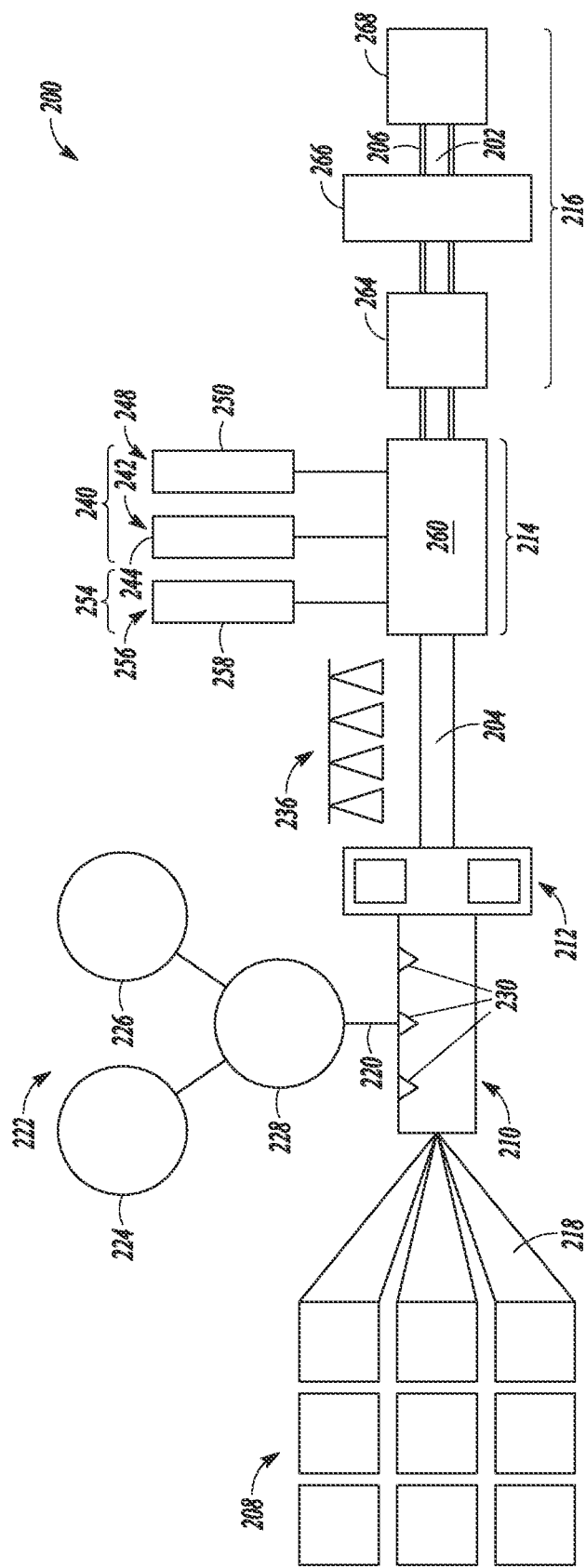
FIG. 2 is a schematic diagram of another example system for manufacturing an example elongate pultrusion article with a coating.

FIG. 2 shows an example of a pultrusion and coating system 200 that is substantially similar to the pultrusion and coating system 100 of FIG. 1 in that the system 200 of FIG. 2 is configured to manufactures a pultruded substrate 204 and applies a coating 206 to the substrate 204 to provide the coated pultrusion article 202, e.g., wherein the coating 206 can be selected to provide one or more improved properties, such as at least one of improved aesthetics, improved color, or improved weatherability compared to the uncoated substrate 204. For example, like the system 100, the pultrusion and coating system 200 of FIG. 2 includes a feed system 208 that provides a feedstock 218 to the system 200, a resin-injection assembly 210, a pultrusion die 212, a coating system 214, and a finishing system 216.

Each of the systems or assemblies 208, 210, 212, and 216 can be substantially similar or identical to that which is described above with respect to the system 100 of FIG. 1. For example, the feed system 208 can deliver a feedstock 218 that is substantially similar or even identical to the feedstock 118 in the system 100, such as by comprising one or more reinforcement structures, such as reinforcing fibers, to which a resin can be applied in order to provide a composite material in the form of the pultrusion substrate 204. The feed system 208 can also deliver a polymer resin 220 to the resin-injection assembly 210, where the polymer resin 220 is contacted with and impregnated into the feedstock 218. For example, the resin-injection assembly 210 can include a resin-mixing system 222 comprising one or more resin storage vessels 224, 226 to store one or more resin constituents. A mixing apparatus 228 can mix resin constituents to form the final desired polymer resin 220, which is then fed to one or more resin nozzles 230, which inject or otherwise apply the polymer resin 220 to the feedstock 218. The resin-injected feedstock 218 is then pulled or otherwise forced through the pultrusion die 212 to shape the resin-injected feedstock 218 into the form of the pultrusion substrate 204. One or more heaters 236 to maintain a temperature of the pultrusion substrate 204, e.g., to improve adhesion of an adhesive material to the pultrusion substrate 204 (as described in more detail below). In alternative embodiments, the system can omit in-line heaters and control the temperature of the pultrusion substrate 204 at the pultrusion die 212 itself, as described above.

The coating 206 is applied onto the pultrusion substrate 204 with the coating system 214. Like the coating system 114 shown in FIG. 1, the coating system 214 in the pultrusion and coating system 100 of FIG. 2 includes a coating-material application assembly 240. The coating-material application assembly 240 includes one or more coating material extruders 242, 248 that each apply a coating material to form one or more corresponding coating material layers. For example, a first coating material extruder 242, comprising a first coating material storage vessel 244, forms a first coating layer, and a second coating material extruder 248, comprising a second coating material storage vessel 250, forms a second coating layer, e.g., on top of the first coating layer. The coating material extruders 242, 248 can each include separate extrusion dies, similar to the first and second coating material dies 146 and 152 shown in FIG. 1, or, as shown in the example of FIG. 2, the first and second coating layers can be coextruded through a co-extrusion die 260 (discussed in more detail below).

The primary difference between the system 200 of FIG. 2 and the system 100 of FIG. 1 is that the coating system 214 further includes an adhesive-application assembly 254 so that the coating 206 includes one or more adhesive tie layers disposed between the pultrusion substrate 204 and the other coating-material layers. As used herein, the term "adhesive tie layer" or "tie layer," can refer to one or more layers of an adhesive material between the pultrusion substrate 204 and the one or more layers of the coating material. The one or more adhesive tie layers provide for coating the one or more layers of the coating material onto a pultrusion substrate 204 that is not generally conducive to being directly coated with the coating material, such as a substrate with relatively smooth surfaces or that has a relatively small surface energy such as polyurethane or polyurethane-based pultrusion substrates. In an example, the one or more adhesive tie layers provide an adhesive strength between the one or more coating layers and the pultrusion substrate 204 that is higher than could be possible if the coating material was applied directly to the pultrusion substrate 204.

The adhesive-application assembly 254 applies one or more adhesive materials onto at least a portion of the profile surfaces on the pultrusion substrate 204 in order to form the one or more adhesive tie layers. In examples where the coating system 214 includes the adhesive-application assembly 254, the coating-material application assembly 240 applies one or more coating materials onto the one or more adhesive tie layers in order to form the one or more layers of the coating 206. In an example, the adhesive-application assembly 254 includes an adhesive material extruder 256 comprising at least one adhesive material storage vessel 258. The at least one adhesive material storage vessel 258 stores the one or more adhesive materials for delivery to an adhesive material die, which can include one or more material dies if needed (e.g., if two or more adhesive tie layers are being applied). The adhesive material die can comprise a separate die for the adhesive material, similar to the separate dies 146, 152 for the separate coating materials from the coating material extruders 142, 148 in FIG. 1, or the adhesive material die can be part of a co-extrusion die 260 that is combined with one or both of the dies used for the coating material extruders 242, 248. As shown in the example of FIG. 2, the system 200 includes a single co-extrusion die 260 that coextrudes the adhesive material from the adhesive material extruder 256 and the coating materials from the first and second coating material extruders 242, 248 in a single die.

In an example, the adhesive-application assembly 254 includes an adhesive heater (such as a stand-alone heater, a heater as part of the adhesive material die, or a heater in the adhesive material extruder 256. The adhesive heater can heat the one or more adhesive materials to the adhesive-application temperature, described above. In an example, the adhesive-application temperature is at least about the temperature of the pultrusion substrate 204.

In an example, the adhesive-application assembly 254 applies one or more extrudable adhesive materials onto the pultrusion substrate 204 so that the one or more extrudable adhesive materials form one or more adhesive tie layers on the pultrusion substrate 204. In an example, the one or more extrudable adhesive materials include an extrudable thermoplastic adhesive. In some examples, the extrudable thermoplastic adhesive includes, but is not limited to, one or more of: a polyamide; a copolyamide; a block copolymer of a polyamide and a polyester; a thermoplastic polyurethane; an acrylic; a stryrenic or butadiene-based block copolymer; a functionalized olefin; a functionalized acrylic; polylactic acid (PLA); or acrylonitrile-butadiene-styrene (ABS). In an example with a polyurethane-based pultrusion substrate 204 and at least one acrylic-based coating layer, copolyamide-based adhesive materials were found to be particularly useful, such as a copolyamide blend, for example a copolyamide blend of two or more different and varying polyamide repeat units. An example of such a copolyamide-based adhesive material is the extrudable polyamide adhesive blend sold under the trade name PLATAMID by Arkema Inc., Colombes, France. As described in more detail in the EXAMPLES below, in some cases, an adhesive material comprising a thermoplastic polyurethane was found to be particularly effective for coated articles that are to be used in exterior applications, such as with exterior facing surfaces of window frames or door frames. The thermoplastic polyurethane material used to form the one or more adhesive tie layers can be an aliphatic thermoplastic polyurethane or an aromatic thermoplastic polyurethane. Examples of thermoplastic polyurethanes that can be used for such applications include, but are not limited to, the polyether-based thermoplastic polyurethanes sold under the following trade names: TEXIN by Covestro AG (formerly Bayer MaterialScience), Leverkusen, Germany; BYNEL by E. I. du Pont de Nemours and Company USA, Wilmington, DE, USA; KRYSTALGRAM by Huntsman International LLC, The Woodlands, TX, USA; and PEARLBOND by Lubrizol Advanced Materials, Inc., Brecksville, OH, USA.

The finishing system 216 of the pultrusion and coating system 200 can be substantially identical to the finishing system 116 of system 100. For example, the finishing system 116 can include a cooling assembly 264, pulling mechanism 266, and a cutting mechanism 268, which can each be similar or identical to the cooling assembly 164, pulling mechanism 166, and cutting mechanism 168 described above with respect to FIG. 1.

Figure 4:
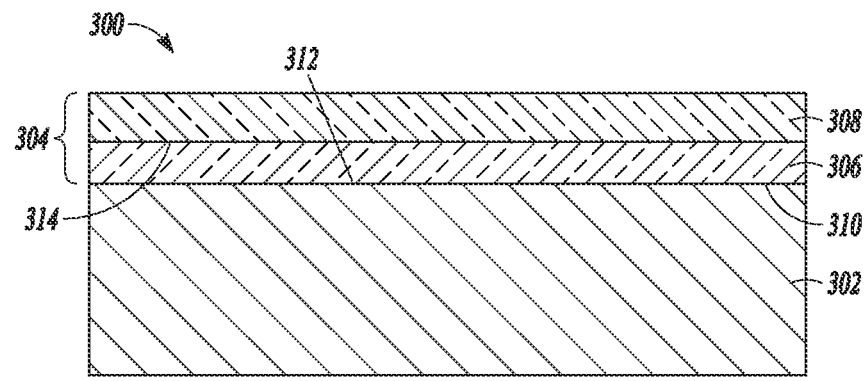
FIGS. 4 and 5 are cross-sectional views of example pultrusion articles taken along line A-A in FIG. 3A.
Figure 5:
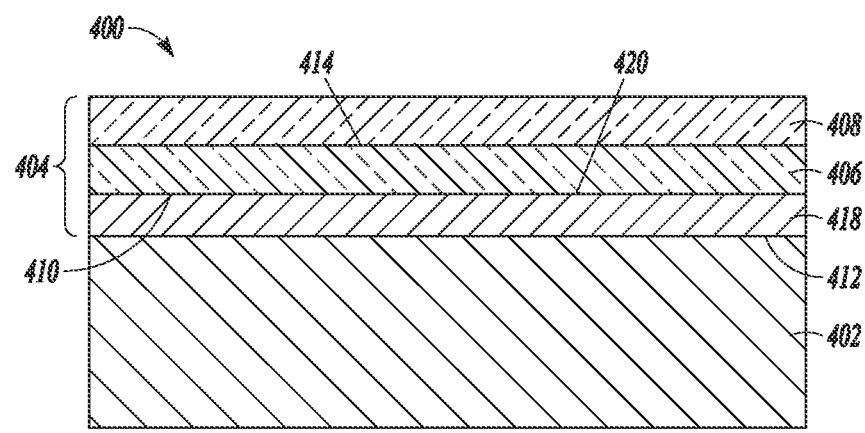

FIGS. 4 and 5 show cross-sectional views of examples of coated pultrusion articles 300, 400 formed by coating a pultrusion substrate 302, 402 with a respective coating 304, 404. The cross-sections of FIGS. 4 and 5 are enlarged to show the structures that make up the example coated pultrusion articles 300 and 400, and are not necessarily drawn to scale.

The coated pultrusion article 300 shown in FIG. 4 is an example of a coated article that is produced by the pultrusion and coating system 100 described above with respect to FIG. 1. The pultrusion substrate 302 in the example coated pultrusion article 300 can comprise a resin injected feedstock that has been shaped, e.g., by pultrusion through a pultrusion die, into a three-dimensional profile having one or more profile surfaces, including, but not limited to coated forms of the example pultrusion substrates 104A and 104B shown in FIGS. 3A and 3B. For purposes of illustration, the coated pultrusion article 300 in FIG. 4 is shown as a cross section of a coated modular patio door sill 102A taken along line 4-4 in FIG. 3A, although this particular section line is shown merely to provide context. Those of skill in the art will appreciate that the example layers of the coated pultrusion article 300 can be from any profile shape, not necessarily the profile 132A shown in FIG. 3A.

In the example coated pultrusion article 300 shown in FIG. 4, the material of the example pultrusion substrate 302 is one onto which the coating materials described below can be directly coated, e.g., the pultrusion substrate 302 has a roughness or high enough surface energy such that the coating material will sufficiently adhere and/or bond directly to an outer surface 312 of the pultrusion substrate 302, such as when the pultrusion substrate 302 is formed using a polyester or polyester-based resin. The example coating 304 comprises a pair of coating layers 306, 308. In an example, the coating layers 306, 308 comprise a protective bi-layer with a first protective layer 306 (also referred to as the inner protective layer 306) having an inner face 310 that is in direct contact with an outer surface 312 of the pultrusion substrate 302. A second protective layer 308 (also referred to as the outer protective layer 308) forms an interface 314 with the inner protective layer 306. The term "interface," e.g., in reference to the interface 314 between the inner and outer protective layers 306, 308, can refer to a physical boundary, e.g., between physically distinct layers, or to an amorphous transition zone between different materials (e.g., when two thermopolymer materials are thermally coextruded to form a substantially continuous multi-layer structure). As shown in FIG. 4, the interface 314 opposes the inner face 310 of the inner protective layer 306 and opposes an outer face 316 of the outer protective layer 308, e.g., such that the inner face 310 and the interface 314 are on opposite sides of the inner protective layer 306 and such that the outer face 316 and the interface 314 are on opposite sides of the outer protective layer 308. In an example, the inner protective layer 306 has a thickness from about 3 mils (wherein the measurement term "mil," as used herein, refers to one one-thousandth of an inch, or 0.001 inches) to about 5 mils and the outer protective layer 408 has a thickness of from about 1 mils to about 5 mils. The example coated pultrusion article 300 shown in FIG. 4 can be made using the pultrusion and coating system 100 shown in FIG. 1, e.g., the system 100 with a coating system 114 that includes only a coating-material application assembly 140 without an adhesive material application assembly.

Turning to the example coated pultrusion article 400 shown in FIG. 5, like the coating 304 in FIG. 4, the example coating 404 also comprises a pair of coating layers 406, 408, such as a protective bi-layer with a first protective layer 406 (also referred to as the inner protective layer 406) having an inner face 410 and a second protective layer 408 (also referred to as the outer protective layer 408) that forms an interface 414 with the inner protective layer 406 and that has an outer face 416. Like the interface 314 between the protective layers 306 and 308 in FIG. 4, the interface 414 between the inner and outer protective layers 406, 408, can be a physical boundary, e.g., between physically distinct layers, or to an amorphous transition zone between different materials.

Unlike the material of the pultrusion substrate 302 in FIG. 4, the material of the example pultrusion substrate 402 in FIG. 5 is one onto which the coating materials described below will not reliably bond, e.g., an outer surface 412 of the pultrusion substrate 402 is relatively smooth or has a relatively small surface such that the coating materials do not readily bond to the outer surface 412, such as when the pultrusion substrate 402 is formed using a polyurethane or polyurethane-based resin. Therefore, the coated pultrusion article 400 includes an adhesive tie layer 418 disposed between the pultrusion substrate 402 and the coating layers 406, 408. For example, the adhesive tie layer 418 is deposited directly onto the substrate outer surface 412 while the inner protective layer 406 is deposited onto the adhesive tie layer 418, e.g., such that the inner face 410 of the inner protective layer 406 is in contact with an outer surface 420 of the adhesive tie layer 418. The example coated pultrusion article 400 shown in FIG. 5 can be made using the pultrusion and coating system 200 shown in FIG. 2, e.g., the system 200 with a coating system 214 that includes a coating-material application assembly 240 and an adhesive material application assembly 254. In an example, the adhesive tie layer 418 has a thickness from about 1.5 mils to about 5 mils. In an example, the inner protective layer 406 has a thickness from about 3 mils to about 5 mils and the outer protective layer 408 has a thickness of about 1 mils to about 5 mils.

In an example, the adhesive tie layer 418 comprises an adhesive material that adheres to both the outer surface 412 of the pultrusion substrate 402 and to the material of the inner protective layer 406. In some examples, the adhesive tie layer 418 is formed from an extrudable adhesive material, such as an extrudable thermoplastic adhesive. In some examples, the extrudable thermoplastic adhesive includes, but is not limited to, one or more of: a polyamide; a copolyamide; a block copolymer of a polyamide and a polyester; a thermoplastic polyurethane; an acrylic; a stryrenic or butadiene-based block copolymer; a functionalized olefin; a functionalized acrylic; polylactic acid (PLA); or acrylonitrile-butadiene-styrene (ABS). In an example wherein the pultrusion substrate 402 was formed from a polyurethane or polyurethane-based resin and the inner protective layer 406 comprises an acrylic-based coating layer, copolyamide-based adhesive materials were found to be particularly useful, such as a copolyamide blend, for example a copolyamide blend of two or more different and varying polyamide repeat units. An example of such a copolyamide-based adhesive material is the extrudable polyamide adhesive blend sold under the trade name PLATA-MID by Arkema Inc., Colombes, France. In another example, the adhesive tie layer 418 comprises a thermoplastic polyurethane adhesive material to bond the protective layer 406 to the pultrusion substrate 402, for example an aliphatic thermoplastic polyurethane or an aromatic thermoplastic polyurethane.

In an example, each coated pultrusion article 300, 400 includes a protective bilayer with an inner protective coating layer 306, 406 comprising a first protective material and an outer protective coating layer 308, 408 comprising a second protective coating material. In an example, one or both of the inner protective coating layer 306, 406 and the outer protective coating layer 308, 408 comprises at least one of: a weather resistant layer, or the like.

In an example, the first protective coating material that forms the inner protective coating layer 306, 406 is different from the second protective coating material that forms the outer protective coating layer 308, 408. For example, the first protective coating material of the inner protective coating layer 306, 406 can comprise a composition configured to provide for a first type of protection and the second protective coating material of the outer protective coating layer 308, 408 can comprise a composition configured to provide for a second type of protection. Each type of protection (e.g., the first type for the inner protective coating layer 306, 406 and the second type for the outer protective coating layer 308, 408) can include, but is not limited to, at least one of: UV protection, precipitation protection, temperature protection, chemical resistance, scratch resistance protection, or color fading protection.

In an example that has been found to be particularly conducive for providing weathering and chemical resistance with improved gloss retention and color retention, the inner protective coating layer 306, 406 comprises a thermoplastic polymer that is an acrylic or acrylic-based polymer, while the outer protective coating layer 308, 408 comprises a thermoplastic polymer that is a blend of an acrylic or acrylic-based polymer and a fluoride-containing polymer, such as poly(vinylidene difluoride) (also referred to as "PVDF," sold under the trade name KYNAR). The protective bi-layer comprising the inner protective coating layer 306, 406 and the outer protective coating layer 308, 408 described above will hereinafter be referred to as an acrylic-acrylic/fluoride bilayer for the sake of brevity. In contrast, earlier-known protective bilayers where both the inner and outer layers primarily comprise only acrylic-based polymers will be referred to hereinafter as an "acrylic-acrylic bilayer" so that comparisons between the acrylic-acrylic/fluoride bilayer of the present disclosure and the previously-known acrylic-acrylic bilayer can be discussed with relative brevity.

Examples of acrylic or acrylic-based polymers that can be used to form the inner protective coating layer 306, 406 or that is part of the blend of the outer protective coating layer 308, 408 include, but are not limited to, a thermoplastic polymer that include at least a portion of its polymer backbone that comprises a polyacrylate chain, including those comprising poly(methyl methacrylate) (also referred to as "PMMA"), poly(methyl acrylate) (also referred to as "PMA") and polyacetyls. Examples of fluoride-containing polymers that can be used to form the blend of the outer protective coating layer 308, 408 include, but are not limited to, poly(vinylidene difluoride) (also referred to as "PVDF," sold under the trade name "KYNAR") or poly(tetrafluoroethylene) (also referred to as "PTFE," and sold under the trade name "TEFLON").

In a preferred example, the inner protective coating layer 306, 406 comprises an acrylic-based polymer, such as PMMA, and the outer protective coating layer 308, 408 comprises a blend of an acrylic-based polymer, such as PMMA, and PVDF, wherein one or both of the inner protective coating layer 306, 406 and the outer protective coating layer 308, 408 may optional include one or more additives such as colorant or dye and one or more stabilizer compounds such as an antioxidant or a UV-resistant compound.

The inventors have found that including a specified amount of a fluoride-containing polymer, such as PVDF, in a blend with an acrylic or acrylic-based polymer to forms the outer protective coating layer 308, 408 provides for improved results in the overall coated pultrusion article 300, 400 that are beyond that which was expected. For example, the inventors found that if an outer layer that is entirely or substantially entirely PVDF was attempted, it will not adequately adhere to an acrylic-based inner protective layer. Thus, an outer protective layer that was all or substantially all fluoride-containing polymer would tend to delaminate and fail. It was also found that fluoride-containing polymers or blends with a relatively high content of fluoride-containing polymers are crystalline or semi-crystalline when in the solid state, and that when the outer protective layer is crystalline or semi-crystalline, the chemical or weathering protection of the resulting protective bilayer is less robust, e.g., less able to withstand long-term weather or chemical exposure, than an acrylic/fluoride blend that results in an amorphous solid that forms the outer protective coating layer 308, 408. Without wishing to be bound to this theory, the inventors believe that an outer protective coating layer 308, 408 formed from an acrylic/fluoride-polymer blend that is amorphous is more resistant to mechanical damage (e.g., from scratching), to weathering (e.g., is better able to withstand longer periods of exposure and to more extreme weather conditions with less change in appearance, such as less color fading and less loss in glossiness), and to chemical exposure (e.g., is better able to withstand exposure to certain chemicals) than when the outer layer comprises an acrylic/fluoride-polymer blend but is crystalline or semi-crystalline.

In some examples, the protective bi-layer described above, e.g., with the inner protective coating layer 306, 406 comprising an acrylic polymer such as PMMA and the outer protective coating layer 308, 408 comprising a specified blend of an acrylic polymer, such as PMMA, and a fluoride-containing polymer, such as PVDF, is able to pass a higher weathering performance standard compared to earlier known comparable protective coatings comprising a bilayer that included on acrylic-based protective layers. For example, in some examples the acrylic-acrylic/fluoride bilayer described above is able to pass the American Architectural Manufacturers Association ("AAMA") 625 Voluntary Specification, i.e., color retention with a delta E of 5 or less and a gloss retention of at least 50% gloss retention after 10 years of weathering. Earlier protective coatings comprising a bilayer with both protective layers comprising primarily acrylic materials were found to be only able to pass the AAMA 624 Voluntary Specification, which requires the delta E color retention of 5 or less after only 5 years of weathering (rather than 10 years as with the AAMA 625 Voluntary Specification), and only specifies a gloss retention of at least 30% after 5 years of weathering (again compared to the higher gloss retention required after a full 10 years of weathering). The addition of the fluoride-containing polymer (e.g., PVDF) in the acrylic-acrylic/fluoride bilayer was also able to better withstand exposure to typical cleaning chemicals, which have been found to result in either stress cracking due to chemical exposure or delamination, or both, than an acrylic-acrylic bilayer. In short, the acrylic-acrylic/fluoride bilayer described above demonstrates superior chemical and weathering resistance while achieving comparable or superior scratching or marring resistance compared to the earlier acrylic/acrylic protective bilayers.

At the time the present application was filed, fluoride-containing polymers such as PVDF or PTFE tend to be more expensive to procure than acrylic or acrylic-based polymers such as PMMA. Therefore, it can be desirable to select a formulation of the outer protective coating layer 308, 408 that has just enough of the fluoride-containing polymer in the blend to achieve for a desired chemical resistance and/or weatherability specification, such as those required to meet the AAMA 625 standard described above, but not too much more than that amount so as to optimize the cost of producing the protective bi-layer that includes the outer protective coating layer 308, 408.

The inventors have found that if the amount of the fluoride-containing polymer in the outer protective coating layer 308, 408 is too low, than the weathering resistance or chemical resistance is less because there is not enough of the fluoride-containing polymer present in the outer protective coating layer 308, 408. The inventors have also found that if the amount of the fluoride-containing polymer is too high than one or more of the following might be true: the outer protective coating layer 308, 408 might have difficulty adhering to the inner protective coating layer 306, 406; the outer protective coating layer 308, 408 might be too crystalline or semi-crystalline (which the inventors believe reduces the weatherability and chemical resistance capabilities of the protective bi-layer); or the outer protective coating layer 308, 408 might be overly expensive without providing any additional weatherability or chemical resistance.

In an example, the blend of the outer protective coating layer 308, 408 comprises from about 25 wt. % of the fluoride-containing polymer to about 50 wt. % of the fluoride-containing polymer, with the balance of the outer protective coating layer 308, 408 (e.g., from about 50 wt. % to about 75 wt. %) comprising the acrylic or acrylic-based polymer (while also allowing for a small percentage, e.g., up to about 5 wt. % to 8 wt. %, of additives such as antioxidants, ultraviolet-resistant additives, colorants or dyes, or other additives that are typical for protective coatings on pultrusion articles). Combinations of the fluoride-containing polymer and the acrylic-based polymer in this range was found to achieve the objectives of the protective bi-layer discussed above. In an example wherein the fluoride-containing polymer comprises PVDF, the blend of the outer protective coating layer 308, 408 comprises from about 35 wt. % to about 45 wt. % PVDF, and from about 55 wt. % to about 65 wt. % of the acrylic or acrylic-based polymer (such as PMMA), such as a blend that is about 40 wt. % PVDF and about 60 wt. % acrylic polymer.

Additional layers beyond the inner protective coating layer 306, 406 and the outer protective coating layer 308, 408 can be include on each of the coated pultrusion articles 300, 400. For example, the coated pultrusion article 300, 400 can also include one or more of a clear-coat layer, a capping layer, a gloss layer, a texturized outer layer (not shown).

Figure 6:
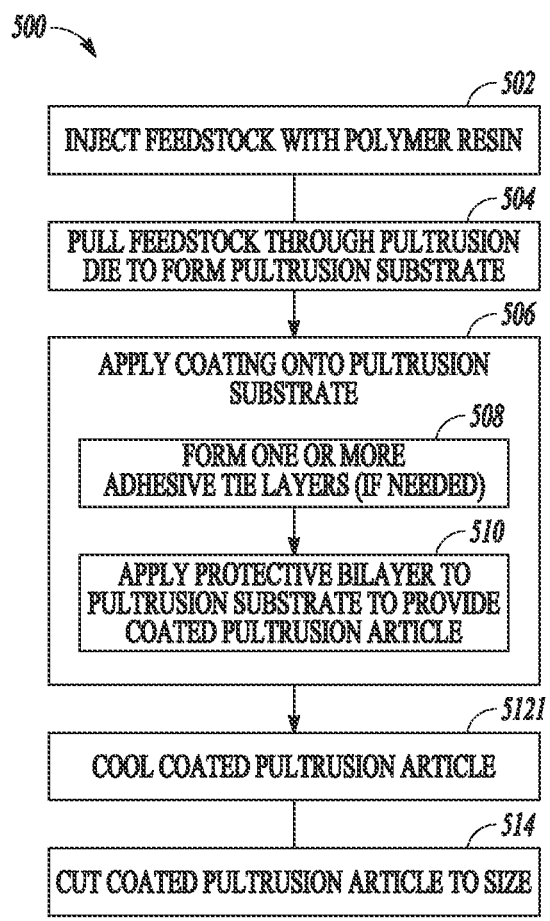
FIG. 6 is a flow diagram of an example method of manufacturing an example elongate pultrusion article.

FIG. 6 is a diagram of an example method 500 for coating a substrate, such as a pultrusion substrate, to form a coated article. The method includes, at step 502, injecting a feedstock with a polymer resin to provide a resin-injected feedstock. In an example, resin-injecting the feedstock 502 can include aligning the feedstock prior to injecting the polymer resin, such as by aligning the feedstock from one or more roving.

In an example, the feedstock can comprise one or more reinforcing structures, such as one or more reinforcing fibers. The polymer resin can comprise a composition of one or more resin components. The one or more resin components can be mixed, for example with a mixing apparatus, to form the polymer resin. In an example, the polymer resin comprises a polyester-based resin. In another example, the polymer resin comprises a polyurethane-based resin, such as a resin formed from a mixture of one or more polyols and one or more isocyanates. Resin-injecting the feedstock 502 can be performed by one or more injections nozzles, such as the resin nozzles 130, 230 described above. In an example. Resin-injecting the feedstock 502 can be performed, for example, with the resin-injection assembly 110, 210 described above with respect to FIGS. 1 and 2.

The method 500 can include, at step 504, pulling the resin-injected feedstock through a pultrusion die. The pultrusion die can shape the resin-injected feedstock into a three-dimensional profile shape having one or more profile surfaces. In an example, the step of pulling the feedstock 504 can be performed by the pulling mechanism 166, 266 described above with respect to FIGS. 1 and 2. The pultrusion die used in the step of pulling the feedstock 504 can be the pultrusion die 112, 212 described above with respect to FIGS. 1 and 2.

Continuing with FIG. 6, the method 500 includes, at 506, applying a coating onto the pultrusion substrate. Applying the coating 506 can include one or both of: at 508, adhering one or more adhesive materials onto at least a portion of the one or more profile surfaces of the pultrusion substrate to form one or more adhesive tie layers on the pultrusion substrate; and, at 510, applying a protective bilayer comprising an inner protective layer and an outer protective layer to the pultrusion substrate (e.g., either directly to one or more profile surfaces of the pultrusion substrate or to the one or more adhesive tie layers formed in step 508) to provide the coated pultrusion article. Whether the method 500 includes just applying the protective bilayer such that applying the coating 506 only includes step 510 or comprises both forming the one or more adhesive tie layers and applying the protective bilayer such that applying the coating 506 includes both steps 508 and 510, will depend on the material of the pultrusion substrate, and in particular the material of the polymer resin. As described above, when a polyester-based resin is used, the protective bilayer materials described above are able to be applied and bonded directly to the pultrusion substrate, such that step 508 can be omitted. However, when a polyurethane-based resin is used, it is often difficult to bond the protective bilayer directly to the urethane-based substrate, such that step 508 can be included to provide an adhesive bilayer that can adhere the protective bilayer to the pultrusion substrate.

In examples that include the step of forming the one or more adhesive tie layers 508, the step 508 can include heating the pultrusion substrate to an adhesive-application temperature. The adhesive-application temperature can be a temperature that will enable one or more of: improved adhesion of the adhesive material to the pultrusion substrate or improved formation of the one or more adhesive tie layers. In an example, the pultrusion substrate is heated to an adhesive-application temperature is at least about 110° F. In an example, heating the pultrusion substrate to promote adhesion of the adhesive tie layers (e.g., as part of step 508) can include raising the temperature of the pultrusion substrate to at least about 250° F. so that the pultrusion substrate can cool slightly before the adhesive material is applied to the pultrusion substrate, and such that the adhesive material can still sufficiently adhere. Forming the one or more adhesive tie layers 508 can further include extruding the one or more adhesive materials onto at least the one or more profile surfaces of the pultrusion substrate, such as through an adhesive extrusion die, for example a cross-head extrusion die. In an example, the adhesive-application assembly 254 described above with respect to FIG. 2 can be used to apply and adhere the one or more adhesive materials, for example with the adhesive material extruder 256.

Applying the protective bilayer 510 can include extruding a coating material of the inner protective layer and the outer protective layer onto the pultrusion substrate. In examples where the method 500 includes forming the one or more adhesive tie layers (step 508), than the step of applying the protective bilayer 510 includes applying the protective bilayer onto the one or more adhesive tie layers. In examples where step 508 is omitted, the step of applying the protective bilayer 510 includes applying the protective bilayer directly onto one or more profile surfaces of the pultrusion substrate. In an example, the step of applying the protective bilayer 510 can include extruding each of the coating materials of the inner and outer protective layers through an extrusion die.

In some examples, the inner protective layer and the outer protective layer can each be applied by its own coating extrusion die. For example, in the system 100 shown in FIG. 1, a first protective coating material can be extruded through a first coating material extruder 142 to form the inner protective layer and a second protective coating material can be extruded through a second coating material extruder 148 to form the outer protective layer. In other examples, the inner protective layer and the outer protective layer can be formed by co-extrusion. For example, the system 200 shown in FIG. 2 includes a co-extrusion die 260 that co-extrudes a first protective coating material to form the inner protective layer and a second coating material to form the outer protective layer. In an example, the protective coating materials of the inner and outer protective layers are selected to have as closely matching viscosity as possible to optimize adhesion between the co-extruded and adjacent protective layers that form the protective bilayer.

In some examples where applying the coating 506 includes both forming the one or more adhesive tie layers 508 and applying the protective bilayer 510, the step of applying the coating 506 can comprise co-extruding the one or more adhesive materials and the protective coating materials in substantially the same step. For example, as shown in the system 200 of FIG. 2, the co-extrusion die 260 not only coextrudes the first and second protective coating materials, but also coextrudes the adhesive material to form the one or more adhesive tie layers. In an example, the one or more adhesive materials and the protective coating materials are selected to have as closely matching viscosity as possible to optimize adhesion between the co-extruded and adjacent adhesive tie layer and coating layer.

In an example, two or more of resin-injecting the feedstock 502, pulling the feedstock 504, forming the one or more adhesive tie layers 508 (if performed), and applying the protective bilayer 510 can be conducted in a common in-line continuous process. In an example, all of the steps of resin-injecting the feedstock 502, pulling the feedstock 504, forming the one or more adhesive ties layers 508, and applying the protective bilayer 510 are conducted in a common in-line continuous process.

In an example, the method 500 can optionally include, at 512, cooling the coated pultrusion article. Cooling the coated pultrusion article 512 can include one or more of: passively exposing the coated pultrusion article to cooling air, such as air at ambient conditions or further chilled air; applying forced air to the coated pultrusion article, for example at ambient temperature or a cooled or chilled temperature; applying a liquid cooling medium to one or more surfaces of the coated pultrusion article, such as by immersing the coated pultrusion article in a cooling immersion bath or by spraying a liquid cooling medium onto one or more surfaces of the coated pultrusion article coated profile.

The method 500 can further include, at 514, cutting the coated pultrusion article to a specified size. Cutting the coated pultrusion article 514 can be performed with any device capable of accurately cutting the elongate coated pultrusion article to a specified size, such as a specified length. Cutting the coated pultrusion article 514 can also include cutting the coated pultrusion article with a specified cutting shape, e.g., a straight cut, a beveled cut, a chamfered cut, a fillet cut, and the like.

EXAMPLES

Various embodiments of the present invention can be better understood by reference to the following Examples which are offered by way of illustration. The present invention is not limited to the Examples given herein.

Example 1

A polyurethane pultrusion substrate having a flat, rectangular profile with a width of 2 inches was coated with an acrylic coating layer bonded to the polyurethane substrate with an aliphatic polyether-based thermoplastic polyurethane adhesive tie layer to provide a coated article. The acrylic coating layer had a thickness of about 7.7 mil and the thermoplastic polyurethane adhesive tie layer had a thickness of about 2.7.

Comparative Example 2

A polyurethane pultrusion substrate having the same profile and dimensions as the substrate used in EXAMPLE 1 was coated with an acrylic coating layer having the same composition as the PMMA-based coating layer in EXAMPLE 1, but that is bonded with a copolyamide-based adhesive tie layer rather than the thermoplastic polyurethane adhesive tie layer to provide a coated article. The acrylic coating layer had a thickness of 7.6 mil, which is comparable to the thickness of the acrylic coating layer in EXAMPLE 1. The polyamide adhesive tie layer had a thickness of 2.4 mil.

Example 3

A polyurethane pultrusion substrate having the same profile as the pultrusion substrate 104A shown in FIG. 3A (which is designed for use as a window frame) was coated with an acrylic coating layer having the same composition as the PMMA-based coating layer as in EXAMPLE 1 and COMPARATIVE EXAMPLE 2 to provide a coated article. Because the profile has many different surfaces of different sizes that may have different adhesion characteristics, two reference surfaces (or faces) on the profile were selected for testing, a first face 600 and a second face 602, as shown in FIG. 3A. The first face 600 is larger than the second face 602, such that the first face 600 will be referred to as the "large face 600" and the second face 602 will be referred to as the "small face 602." The acrylic coating layer was bonded to the polyurethane substrate with the same aliphatic thermoplastic polyurethane adhesive tie layer as in EXAMPLE 1. The thickness of the acrylic coating layer at the large face 600 was about 12.1 mil and the thickness of the acrylic coating layer at the small face 602 was about 8.8 mil. The thickness of the thermoplastic polyurethane adhesive tie layer at the large face 600 was about 2.7 mil and the thickness of the thermoplastic polyurethane adhesive tie layer at the small face 602 was about 2.8 mil.

Comparative Example 4

A polyurethane pultrusion substrate having the same profile and dimensions as the substrate used in EXAMPLE 3 and shown in FIG. 3A was coated with an acrylic coating layer having the same composition as the PMMA-based coating layer in EXAMPLE 1, COMPARATIVE EXAMPLE 2, and EXAMPLE 3 to form a coated article. The acrylic coating layer was bonded with the same copolyamide-based adhesive tie layer as in COMPARATIVE EXAMPLE 2. The thickness of the acrylic coating layer at the large face 600 was 5.8 mil and the thickness of the acrylic coating layer at the small face 602 was about 8.0 mil. The thickness of the polyamide adhesive tie layer at the large face 600 was about 4.1 mil and the thickness of the polyamide adhesive tie layer at the small face 602 was about 4.3 mil.

Experimental Methods

Samples of each example coated article of EXAMPLE 1, COMPARATIVE EXAMPLE 2, EXAMPLE 3, and COMPARATIVE EXAMPLE 4 were subjected to various tests to analyze the ability of the adhesive tie layers and coating layers to remain adhered to their respective pultrusion substrates. These tests included a dry adhesion test; a wet adhesion test; a lap shear adhesion test; and a scrape adhesion test. Each coated article was also subjected to various environmental tests to examine their resistance to typical environmental exposure, as well as testing of their resilience to impact and chemical exposure.

Dry Adhesion

The adhesion strength of the coated articles as initially manufactured (also called the "dry adhesion") was tested using a PosiTest AT pull-off adhesion tester (DeFelsko Inspection Instruments, Ogdensburg, NY, USA) to measure the force required to pull a specified amount of the coated away from its substrate using hydraulic pressure. The resulting pressure measurement is representative of the adhesion strength of the coating. The adhesion testing was an adapted version of those described in ASTM standards D4541, D7234, and ISO standard 4624. The results are provided in Table 1.

TABLE 1

| Dry Adhesion Results | | | |
|---|---|---|---|
| Coated Article | Adhesive Tie Layer Material | PSI Range | Failure Primary |
| Example 1 | Thermoplastic Polyurethane | 999-1255 | Adhesive to substrate at 85% removal |
| Comparative Example 2 | Polyamide | 1195-1485 | Coating to adhesive at 63% removal |

TABLE 1-continued

Dry Adhesion Results

| Coated Article | Adhesive Tie Layer Material | PSI Range | Failure Primary |
|---|---|---|---|
| Example 3 (Large Face) | Thermoplastic Polyurethane | 2000-2300 | Adhesive to substrate at 80% removal |
| Example 3 (Small Face) | Thermoplastic Polyurethane | 2100-2300 | |
| Comparative Example 4 (Large Face) | Polyamide | 2600-2800 | Coating to adhesive at 80% removal |
| Comparative Example 4 (Small Face) | Polyamide | 2500-2800 | |

The dry adhesion values in Table 1 represent the initial adhesion strength of the coating systems before being exposed to environmental conditions such as weather or chemical exposure. As such, the dry adhesion values were used as a control for the purpose of comparison to the adhesion strength after exposure to the simulated environmental conditions described below. The dry adhesion values in Table 1 show that the coated articles with the thermoplastic polyurethane tie layer (EXAMPLES 1 and 3) have comparable initial adhesion strength to that those with the copolyimide tie layer (COMPARATIVE EXAMPLES 2 and 4).

Wet Adhesion

Each coated article was immersed in a water bath at a temperature of 38° C. (100° F.) for 24 hours and was then removed and tested with the PosiTest AT pull-off adhesion tester according to the same standards as described above for the dry adhesion test. The wet adhesion test simulates exposure of the coated articles to wet and humid conditions. The results are provided in Table 2.

TABLE 2

Wet Adhesion Results

| Coated Article | Adhesive Tie Layer Material | PSI Range | Failure Primary | Comparison to Dry Adhesion |
|---|---|---|---|---|
| Example 1 | Thermoplastic Polyurethane | 1300-1350 | Adhesive to substrate at 95% removal | ~8% increase in pull-off performance |
| Comparative Example 2 | Polyamide | 520-570 | Coating to adhesive at 100% removal | ~80% decrease in pull-off performance |
| Example 3 (Large Face) | Thermoplastic Polyurethane | 2400-2500 | Adhesive to substrate at 95% removal | ~10% increase in pull-off performance |
| Example 3 (Small Face) | Thermoplastic Polyurethane | 2300 | Adhesive Failure at 100% removal | |
| Comparative Example 4 (Large Face) | Polyamide | 950 | Coating to adhesive at 50% removal | ~65% decrease in pull-off performance |
| Comparative Example 4 (Small Face) | Polyamide | 1160 | Coating to adhesive at 100% removal | |

The wet adhesion data indicates that coated articles with the polyamide tie layer (COMPARATIVE EXAMPLES 2 and 4) are more susceptible to moisture than those with a thermoplastic polyurethane, as seen by the decrease in pull-off performance. In comparison, the coated articles with the thermoplastic polyurethane tie layer (EXAMPLES 1 and 3) showed a slight increase in adhesive performance (which the inventors believe may either be a genuine increase in strength over time for the thermoplastic polyurethane tie layer or could be due to measuring error or statistical variance). The data in Table 2 shows that the coating systems with the thermoplastic polyurethane adhesive is, surprisingly, substantially better at adhesion retention and, therefore, will perform better when exposed to a humid environment.

Lap Shear Adhesion

Each coated article was tested using testing machine with the model number QTest 50LP frame, manufactured by MTS Systems Corp., Eden Prairie, MN, USA. The machine is used to evaluate mechanical properties of materials by continuously monitoring load as a function of crosshead travel. The lap shear test is to measure adhesion strength in the shear plane, as opposed to tensile adhesion as is the case with the adhesion tests using the PosiTest AT pull-off adhesion tester. The resulting data is provided in the form of stress strain curves, which can be used to determine properties such as tensile, compressive, and flexural strength and modulus. For the lap shear adhesion test, the MTS testing machine was used with a 50 kN load cell with a crosshead speed of 0.5 in/min and offset jaws. The monitored peak loads were normalized to the area of the assembled lap joint according to generate a PSI value. The results are provided in Table 3. The lap shear testing was conducted on samples of the original, unmodified coated articles (labeled as "Dry Shear" in Table 3) and on samples that were subjected to the wet adhesion exposure conditions described above (labeled "Wet Shear" in Table 3).

TABLE 3

Lap Shear Adhesion Results

| Coated Article | Adhesive Tie Layer Material | PSI Range | Extension Before Break (in) | Failure Primary | Comparison to Dry Adhesion |
|---|---|---|---|---|---|
| Example 1 (Dry Shear) | Thermoplastic Polyurethane | 1700-2150 | 0.085 | Coating to adhseive | N/A |
| Comparative Example 2 (Dry Shear) | Polyamide | 2550-3200 | 0.085 | Coating to adhesive | N/A |
| Example 1 (Wet Shear) | Thermoplastic Polyurethane | 2050-2350 | 0.090 | Coating to adhesive | ~10% increase in PSI performance with sustained extension |
| Comparative Example 2 (Wet Shear) | Polyamide | 1700-2100 | 0.060 | Coating to adhesive | ~40% decrease in PSI and extension at break |

As can be seen in Table 3, the coated articles with the thermoplastic polyurethane tie layer (EXAMPLE 1) was able to sustain performance when exposed to shearing force substantially better than the coated articles with the copolyamide tie layer (COMPARATIVE EXAMPLE 2).

Scrape Adhesion

Each coated article was tested using a balanced beam scrape adhesion and mar test instrument from BYK-Gardner USA, Columbia, MD, USA. This instrument conforms to ASTM D2197 and D5178. The scrape adhesion test examines coatings and surfaces of other materials for their hardness or resistance to being scratched or marred by a pointed, sharp edge or blunt tipped stylus. A loop stylus was used to test the coated articles under various conditions. These conditions included immersion in water having temperatures of 100° F. (about 37.8° C.) and 185° F. (85° C.) for a duration of 24 hours and 30 hours, respectively, conditioning in an oven for 30 minutes at 160° F. (about 71.1° C.) and 185° F. (85° C.), and after conditioning under International Electrotechnical Commission (IEC) standard 591/08 (described below). It was also observed that when the polyamide-based adhesive is removed after IEC conditioning and 185° F. immersion, the coating layer exhibited brittleness and a yellowing of the tie-layer.

The scrape adhesion test found that coated articles with the thermoplastic polyurethane tie layer (EXAMPLES 1 and 3) required a higher load to be scraped off their respective substrates as compared to coated articles with the polyamide-based tie layer (COMPARATIVE EXAMPLES 2 and 4).

Soak Freeze

Each coated article was subjected to a number of immersion and freezing cycles, with each cycle including immersion of the coated article in room temperature tap water bath for 4 hours followed by removal and placement in a −25° F. freezer for 4. Samples were analyzed after 50 freezing cycles and 100 freezing cycles using the PosiTest pull off adhesion, the lap shear adhesion, and the scrape adhesion tests described above. The samples were also exposed to isopropyl alcohol (IPA) for an IPA resistance test. For the profiles of EXAMPLE 3 and COMPARATIVE EXAMPLE 4, only the Large Face of the profile was measured. Results are compiled in Table 4.

TABLE 3

Lap Shear Adhesion Results

| Coated Article | Adhesive Tie Layer Material | Test | Value | Comparison to Dry Adhesion |
|---|---|---|---|---|
| Example 1 (50 cycles) | Thermoplastic Polyurethane | Posi Lap Shear Scape IPA Resistance | 1005 PSI 1709 PSI No Effect No Negative Effect | Both Lap Shear and Posi Test show ~10% decrease with little to no change in elongation at break |
| Comparative Example 2 (50 cycles) | Polyamide | Posi Lap Shear Scape IPA Resistance | 660 PSI 2214 PSI Slight Decrease No Negative Effect | Posi Test: ~50% decrease Lap Shear: ~20% decrease and a slight decrease to elongation at break |

TABLE 3-continued

Lap Shear Adhesion Results

| Coated Article | Adhesive Tie Layer Material | Test | Value | Comparison to Dry Adhesion |
|---|---|---|---|---|
| Example 3 (Large Face 50 cycles) | Thermoplastic Polyurethane | Posi Scrape IPA Resistance | 2182 PSI No effect No Negative Effect | Sustained performance |
| Comparative Example 4 (Large Face 50 cycles) | Polyamide | Posi Scrape IPA Resistance | 907 PSI Chip at 3 No Negative Effect | Posi Test: ~65% decrease Scrape had a failure mode change at lower load |
| Example 3 (Large Face 100 cycles) | Thermoplastic Polyurethane | Posi Scrape IPA Resistance | 2600 PSI No Effect No Negative Effect | Showed an increase of ~20% |
| Comparative Example 4 (Large Face 100 cycles) | Polyamide | Posi Scrape IPA Resistance | 888 PSI Chip at 3 No Negative Effect | Posit Test shows ~65% decrease Scrape had a failure mode change at lower load |

The soak freezing results demonstrate that the articles with the polyamide adhesive tie layers (COMPARATIVE EXAMPLES 2 and 4) have an overall decrease in performance. In contrast, the articles with the thermoplastic polyuretheane adhesive tie layers (EXAMPLES 1 and 3) showed either only a small decrease (EXAMPLE 1), sustained performance (EXAMPLE 3, 50 cycles), or an increase in performance (EXAMPLE 3, 100 cycles) for the adhesion values measured by the PosiTest AT pull-off tester.

IEC Environmental Conditioning Testing

Each coated article was tested according to the International Electrotechnical Commision (IEC) 591/08 standard, which subjected each coated article to a number of heating and freezing cycles, with each cycle including holding the article at 185° F. (85° C.) and 85% relative humidity for 20 hours, followed by decreasing the temperature to −40° F. and holding the article at that temperature for 0.5 hours, and then gradually heating the article up to 73.4° F. (23° C.) and exposing it to a relative humidity of 50%. An environmental chamber from ESPEC North America, Inc. (Hudsonville, MI, USA) was used for the IEC conditioning testing. Each sample was subjected to 10 of the heating and freezing cycles, and the articles were tested on the PosiTest AT pull-off tester at 100 PSI/S at various stages during the cycling process. For EXAMPLE 3 and COMPARATIVE EXAMPLE 4, only the large face of the profile was tested.

Figure 7:
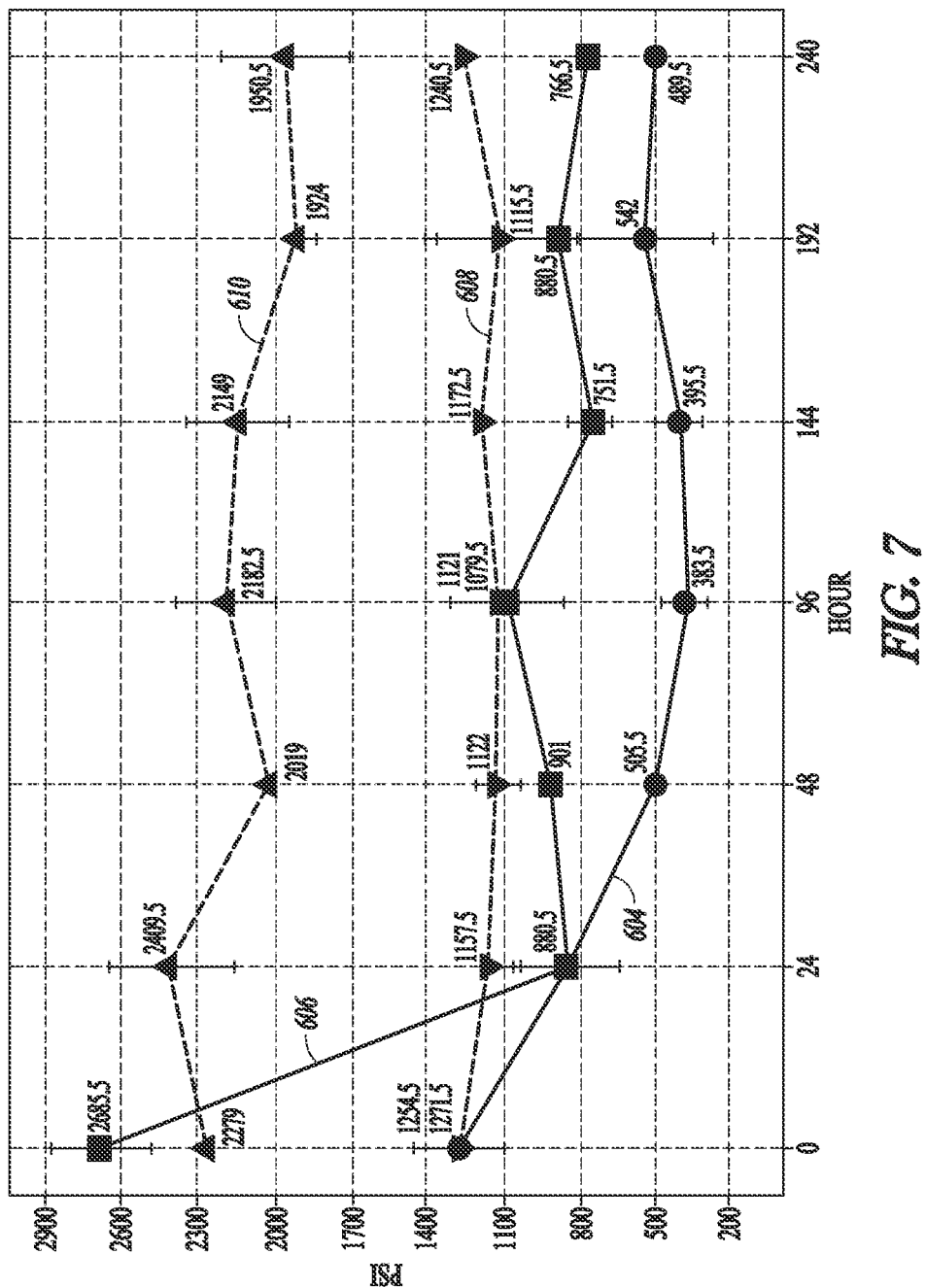
FIG. 7 is a graph of the tensile adhesion during an IEC Environmental Conditioning test for the coated articles of EXAMPLE 1, COMPARATIVE EXAMPLE 2, EXAMPLE 3, and COMPARATIVE EXAMPLE 4.

The resulting data is shown in FIG. 7. The data in FIG. 7 shows that for the articles with the polyamide tie layer (COMPARATIVE EXAMPLES 2 and 4, represented by data series 604 and 606, respectively, in FIG. 7), there was a rapid decline in adhesion values during the heating and freezing cycles. In contrast, the articles with the thermoplastic polyurethane tie layer (EXAMPLES 1 and 3, represented by data series 608 and 610, respectively, in FIG. 7), substantially maintained their adhesive performance throughout the heating and freezing cycles.

Figure 8:
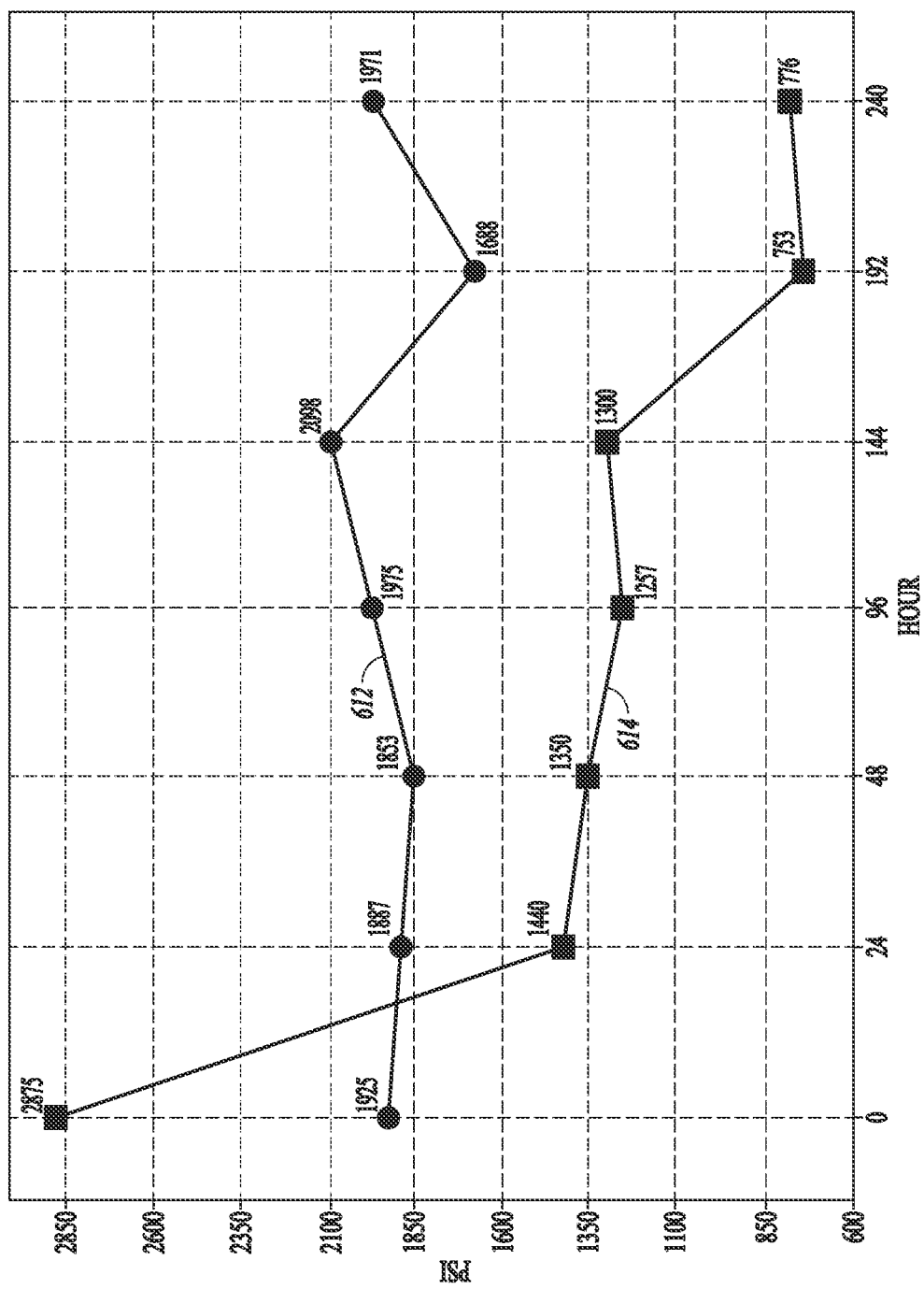
FIG. 8 is a graph of the lap shear during the IEC Environmental Conditioning test for the coated articles of EXAMPLE 1 and COMPARATIVE EXAMPLE 2.

Lap shear was also determined for the coated articles of EXAMPLE 1 and COMPARATIVE EXAMPLE 2 during the heating and freezing cycles. The data is shown in FIG. 8, with data series 612 representing the coated article of EXAMPLE 1 (e.g., with the thermoplastic polyurethane tie layer), and data series 614 representing the coated article of COMPARATIVE EXAMPLE 2 (e.g., with the polyamide tie layer). As can be seen by FIG. 8, the article with the thermoplastic polyurethane tie layer (EXAMPLE 1, data series 612) exhibited a more consistent and sustained adhesion than the article with the polyamide tie layer (COMPARATIVE EXAMPLE 2, data series 614).

Impact Testing

Each coated article was tested according to the AAMA impact standard. Specifically, each coated article was impacted with round-nosed impact tester having a diameter of 16 mm (about ⅝ inches) with a range of 18 N-m (about 160 in-lbf), such as a Gardner impact tester (The Paul N. Gardner Company, Inc., Pompano Beach, FL, USA). A 9 N-m (about 80 in-lbf) load was directed applied to the coated surface of the article. After the impact, a tape was applied to the coating of a sufficient size to cover the impacted area, which was then sharply pulled of at a right angle relative to the plane of the surface being tested. Each tested article was maintained at a temperature of from about 18° C. to about 27° C. The result of each impact test was a determination of either "pass" or "fail." A sample is considered to have failed the test if any of the PMMA-based coating layer is removed from the impact site by the tape. Both the articles with the thermoplastic polyurethane tie layer (EXAMPLES 1 and 3) and the articles with the polyamide tie layer (COMPARATIVE EXAMPLES 2 and 4) passed as tested. However, the samples with the thermoplastic polyurethane tie layer (EXAMPLES 1 and 3) exhibited a preferred mode of failure as compared to the samples with the polyamide tie layer such that it is believed that the articles with the thermoplastic polyurethane tie layer would be less likely to lose coating over time at the impact site. This indicates that there is a slight improvement in impact resistances for the articles with the thermoplastic polyurethane adhesive tie layer compared to the articles with the polyamide adhesive tie layer.

Abrasion Resistance

Each coated article was also subjected to the falling-sand abrasion-resistance test according to ASTM D968. The abrasion-resistance test yielded values of greater than or equal to 20 L/mil for both the coated articles made with the thermoplastic polyurethane tie layer (EXAMPLES 1 and 3) and the coated articles made with the polyamide tie layer (COMPARATIVE EXAMPLES 2 and 4), suggesting comparable abrasion resistance.

Pencil Hardness

The pencil hardness of the coating layers for each coated article was determined according to ASTM D3363-05. The pencil hardness for both the coated articles made with the thermoplastic polyurethane tie layer (EXAMPLES 1 and 3) and the coated articles made with the polyamide tie layer (COMPARATIVE EXAMPLES 2 and 4) had a minimum value of H according to the ASTM D3363-05 standard, suggesting comparable coating hardness for the articles with the thermoplastic polyurethane tie layer and the articles with the polyamide tie layer.

CONCLUSIONS

The results described above indicate that the coating systems with the thermoplastic polyurethane adhesive tie layer (EXAMPLES 1 and 3) shows a dramatic improvement in properties as compared to those with the polyamide adhesive tie layer (COMPARATIVE EXAMPLES 2 and 4), especially with respect to performance when exposed to thermal, moisture conditioning and thermal cycling. In the experience of the present inventors, the above data for the coated articles with the polyamide tie layer (COMPARATIVE EXAMPLES 2 and 4) translates into a field failure after a just a few years of exposure in the field. The data for the coated articles with the thermoplastic polyurethane tie layer (EXAMPLES 1 and 3) indicates that those articles will have significant improvement in performance in the field, which is believed to translate to longer-term durability for the coated articles of EXAMPLES 1 and 3 when compared to the coated articles of COMPARATIVE EXAMPLES 2 and 4.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A coated article comprising:
   a composite substrate comprising a reinforcing feedstock at least partially embedded in a matrix polymer, wherein the substrate includes one or more outer surfaces;
   one or more adhesive tie layers disposed along at least a portion of the one or more outer surfaces, wherein each of the one or more adhesive tie layers is formed from an adhesive material comprising a thermoplastic polyurethane; and
   one or more coating layers disposed above the one or more adhesive tie layers, the one or more adhesive tie layers providing an adhesive interface between the substrate and the one or more coating layers.

2. The coated article of claim 1, wherein at least one of the one or more coating layers comprises an acrylic.

3. The coated article of claim 1, wherein the one or more coating layers includes one or more clear-coat layers.

4. The coated article of claim 1, wherein at least one of the one or more coating layers includes a coloring additive.

5. The coated article of claim 1, wherein the one or more coating layers comprise a first coating layer of a first coating material disposed onto an adhesive layer outer surface of the one or more adhesive tie layers and a second coating layer of a second coating material disposed onto a coating layer outer surface of the first coating layer.

6. The coated article of claim 1, wherein the matrix polymer comprises a polyurethane-based polymer.

7. The coated article of claim 6, wherein an outer one of the one or more coating layers comprises a blend of acrylic and a fluoride-containing polymer.

8. The coated article of claim 2, wherein at least one of the one or more coating layers comprises at least one of: poly(methyl methacrylate), poly(methyl acrylate), and a polyacetyl.

9. A coated article comprising:
   a substrate comprising one or more outer surfaces, wherein the substrate is formed from a matrix polymer;
   one or more adhesive tie layers disposed along at least a portion of the one or more outer surfaces, wherein each of the one or more adhesive tie layers is formed from an adhesive material comprising a thermoplastic polyurethane; and
   one or more coating layers disposed above the one or more adhesive tie layers, the one or more adhesive tie layers providing an adhesive interface between the substrate and the one or more coating layers,
   wherein at least one of the one or more coating layers comprises an acrylic, and wherein an outer one of the one or more coating layers comprises a blend of acrylic and a fluoride-containing polymer.

10. The coated article of claim 9, wherein at least one of the one or more coating layers comprises an acrylic.

11. The coated article of claim 9, wherein the substrate is a composite substrate comprising a reinforcing feedstock at least partially embedded in the matrix polymer.

12. The coated article of claim 9, wherein the matrix polymer comprises a polyurethane-based polymer.

13. The coated article of claim 9, wherein the one or more coating layers includes one or more clear-coat layers.

14. The coated article of claim 9, wherein at least one of the one or more coating layers includes a coloring additive.

15. The coated article of claim 9, wherein the one or more coating layers comprise a first coating layer of a first coating material disposed onto an adhesive layer outer surface of the one or more adhesive tie layers and a second coating layer of a second coating material disposed onto a coating layer outer surface of the first coating layer.

16. A coated article comprising:
   a substrate comprising one or more outer surfaces, wherein the substrate is formed from a matrix polymer comprising a polyurethane-based polymer;
   one or more adhesive tie layers disposed along at least a portion of the one or more outer surfaces, wherein each of the one or more adhesive tie layers is formed from an adhesive material comprising a thermoplastic polyurethane; and
   one or more coating layers disposed above the one or more adhesive tie layers, the one or more adhesive tie layers providing an adhesive interface between the substrate and the one or more coating layers.

17. The coated article of claim 16, wherein at least one of the one or more coating layers comprises an acrylic.

18. The coated article of claim 16, wherein the one or more coating layers includes one or more clear-coat layers.

19. The coated article of claim 16, wherein at least one of the one or more coating layers includes a coloring additive.

20. The coated article of claim 16, wherein the one or more coating layers comprise a first coating layer of a first coating material disposed onto an adhesive layer outer surface of the one or more adhesive tie layers and a second coating layer of a second coating material disposed onto a coating layer outer surface of the first coating layer.

* * * * *